US012512258B2

(12) United States Patent
Kim et al.

(10) Patent No.: US 12,512,258 B2
(45) Date of Patent: Dec. 30, 2025

(54) COIL COMPONENT

(71) Applicant: SAMSUNG ELECTRO-MECHANICS CO., LTD., Suwon-si (KR)

(72) Inventors: Min Jeong Kim, Suwon-si (KR); Young Ji Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 859 days.

(21) Appl. No.: 17/721,804

(22) Filed: Apr. 15, 2022

(65) Prior Publication Data

US 2022/0375680 A1 Nov. 24, 2022

(30) Foreign Application Priority Data

May 24, 2021 (KR) ........................ 10-2021-0066087

(51) Int. Cl.
*H01F 5/00* (2006.01)
*H01F 27/29* (2006.01)
*H01F 27/32* (2006.01)

(52) U.S. Cl.
CPC ........... *H01F 27/323* (2013.01); *H01F 27/29* (2013.01)

(58) Field of Classification Search
CPC ..................................................... H01F 27/323
USPC ........................................................... 336/200
See application file for complete search history.

(56) References Cited

U.S. PATENT DOCUMENTS

2006/0197187 A1 9/2006 Lohninger et al.
2015/0243612 A1* 8/2015 Yamamoto ............... H10D 8/60 257/773
2015/0287514 A1 10/2015 Lim
2015/0380151 A1* 12/2015 Choi ..................... H01F 41/041 336/200
2016/0268038 A1* 9/2016 Choi ..................... H01F 27/255
2020/0286674 A1 9/2020 Han et al.
2020/0365315 A1 11/2020 Kim et al.
2020/0373074 A1 11/2020 Yoshioka et al.
2021/0057138 A1 2/2021 Yang et al.
2021/0098177 A1 4/2021 Gibu
2023/0230752 A1 7/2023 Kim et al.

FOREIGN PATENT DOCUMENTS

JP 58-159734 U 10/1983
JP 1-139421 U 9/1989
JP 2-081027 U 6/1990
(Continued)

OTHER PUBLICATIONS

Office Action issued on Aug. 11, 2025 in the corresponding Korean Patent Application No. 10-2021-0066087 with English tranlation.
(Continued)

*Primary Examiner* — Ronald Hinson
(74) *Attorney, Agent, or Firm* — Morgan, Lewis & Bockius LLP

(57) ABSTRACT

A coil component includes a body, a coil portion disposed in the body, first and second external electrodes spaced apart from each other on one surface of the body and respectively connected to the coil portion, and a marking portion disposed on the one surface of the body and penetrating through the second external electrode.

26 Claims, 9 Drawing Sheets

(56) References Cited

FOREIGN PATENT DOCUMENTS

| | | | |
|---|---|---|---|
| JP | 3-085628 | U | 8/1991 |
| JP | 6-112006 | A | 4/1994 |
| JP | 8-335528 | A | 12/1996 |
| JP | 11-26297 | A | 1/1999 |
| JP | 2006-261643 | A | 9/2006 |
| JP | 2015-164170 | A | 9/2015 |
| JP | 2015-198242 | A | 11/2015 |
| JP | 2020-191364 | A | 11/2020 |
| JP | 2021-506129 | A | 2/2021 |
| JP | 2021-057469 | A | 4/2021 |
| JP | 2023-103942 | A | 7/2023 |
| KR | 10-2020-0106625 | A | 9/2020 |
| KR | 10-2021-0022363 | A | 3/2021 |

OTHER PUBLICATIONS

Office Action issued on Nov. 11, 2025 in the corresponding Japanese Patent Application No. 2022-071176 with English translation.

* cited by examiner

COIL COMPONENT

CROSS-REFERENCE TO RELATED APPLICATION(S)

The present application claims the benefit of priority to Korean Patent Application No. 10-2021-0066087 filed on May 24, 2021 in the Korean Intellectual Property Office, the entire disclosure of which is incorporated herein by reference.

TECHNICAL FIELD

The present disclosure relates to a coil component.

BACKGROUND

An inductor, a coil component, is a representative passive electronic component used in an electronic device together with a resistor and a capacitor.

As electronic devices become increasingly high-performance and small, the number of electronic components used in electronic devices is increasing and miniaturizing.

Meanwhile, a marking portion may be formed on the coil component for the purpose of identifying a direction of mounting on a printed circuit board, etc., predicting a change in mutual inductance, and the like.

Since such a marking portion is generally formed by screen printing, the thickness of the coil component may be as thick as the printing thickness of the marking portion.

SUMMARY

An aspect of the present disclosure may provide a coil component capable of reducing a thickness even after printing a marking portion and minimizing a reduction in inductance characteristics.

An aspect of the present disclosure may print a marking portion on a coil component without a separate additional process.

According to an aspect of the present disclosure, a coil component may include: a body; a coil portion disposed in the body; first and second external electrodes spaced apart from each other on a first surface of the body and respectively connected to the coil portion; and a marking portion disposed on the first surface of the body and penetrating through the second external electrode.

According to another aspect of the present disclosure, a coil component may include: a body; a coil portion disposed in the body; and first and second external electrodes spaced apart from each other on a first surface of the body and respectively connected to the coil portion, in which any one of the first and second external electrodes includes a hole in which an insulating material is filled.

According to still another aspect of the present disclosure, a coil component may include: a body; a coil portion disposed in the body; first and second external electrodes spaced apart from each other on a first surface of the body and respectively connected to the coil portion; and an insulating layer including a first portion and a second portion disposed on the first surface, in which the first portion is disposed between the first and second external electrodes, and the second portion is surrounded by a portion of the first external electrode or the second external electrode.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 3:
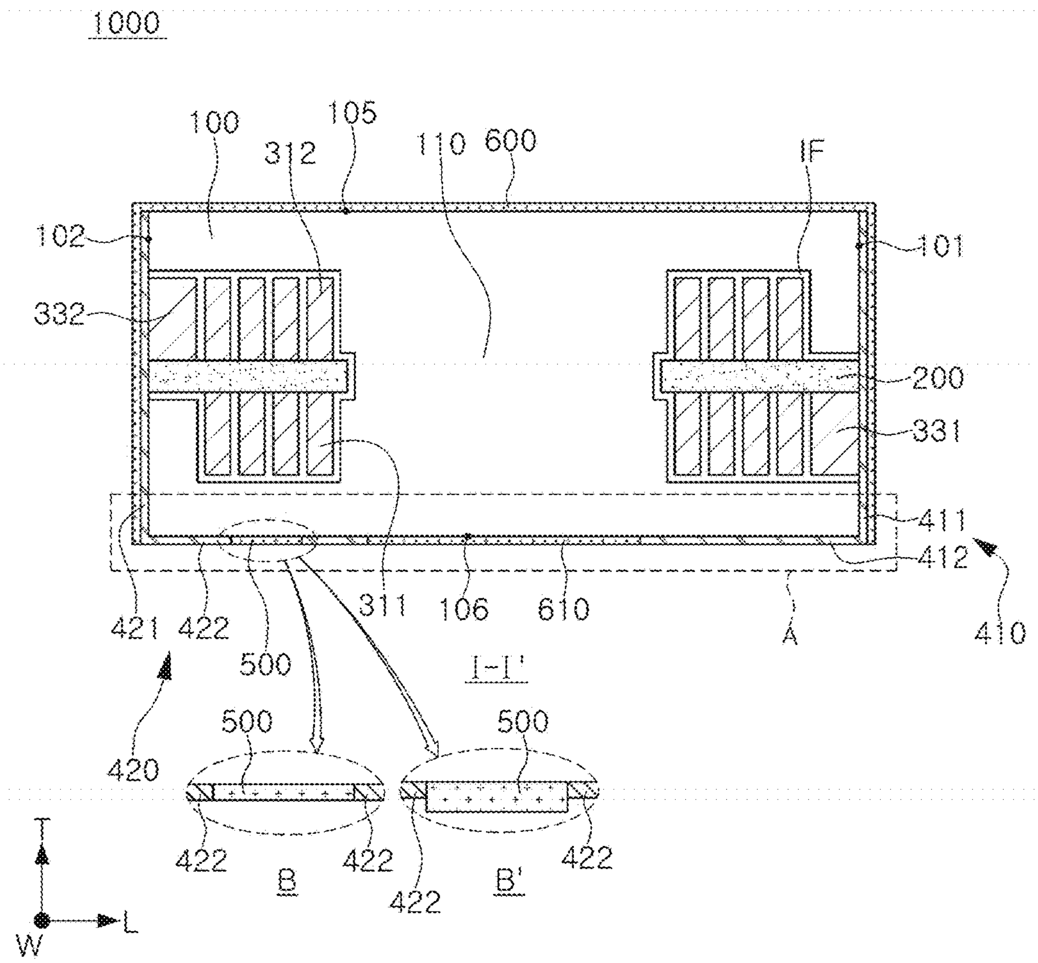
FIG. 3 is a cross-sectional view taken along line I-I' of FIG. 1.

Referring to FIG. 3, a substrate 100 according to an exemplary embodiment in the present disclosure may include a first printed circuit board layer 20, a bridge 200, bridge insulating layers 220 and 240 (see FIGS. 7A through 7C), and a second printed circuit board layer 40.

Terms used in the present specification are used only in order to describe specific exemplary embodiments rather than limiting the present disclosure. Singular forms are intended to include plural forms unless the context clearly indicates otherwise. It will be further understood that the terms “comprises” or “have” used in this specification, specify the presence of stated features, steps, operations, components, parts mentioned in this specification, or a combination thereof, but do not preclude the presence or addition of one or more other features, numerals, steps, operations, components, parts, or a combination thereof. In addition, throughout the specification, the word “on” does not necessarily mean that any element is positioned at an upper side based on a gravity direction, but means that any element is positioned above or below a target portion.

Further, a term “couple” not only refers to a case in which respective components are in physically direct contact with each other, but also refers to a case in which the respective components are in contact with another component interposed therebetween, in a contact relationship between the respective components.

Since sizes and thicknesses of the respective components illustrated in the drawings are arbitrarily illustrated for convenience of explanation, the present disclosure is not necessarily limited to those illustrated in the drawings.

In the drawings, an L direction refers to a first direction or a length direction, a W direction refers to a second direction or a width direction, and a T direction refers to a third direction or a thickness direction.

Hereinafter, coil components according to exemplary embodiment in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description therefor will be omitted.

Various kinds of electronic components may be used in an electronic device, and various kinds of coil components may be appropriately used between these electronic components depending on their purposes in order to remove noise, or the like.

That is, the coil components used in the electronic device may be a power inductor, high frequency (HF) inductors, a general bead, a bead for a high frequency (GHz), a common mode filter, and the like.

First Exemplary Embodiment

Figure 1:
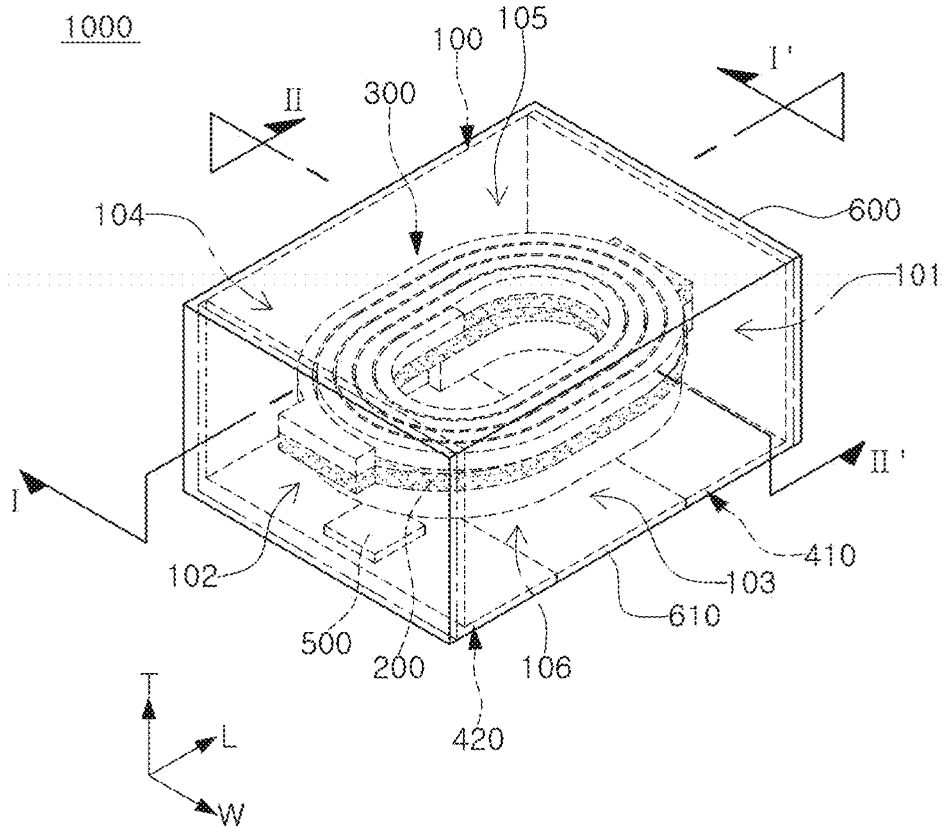
FIG. 1 is a schematic perspective view illustrating a coil component according to an exemplary embodiment in the present disclosure.
Figure 2:
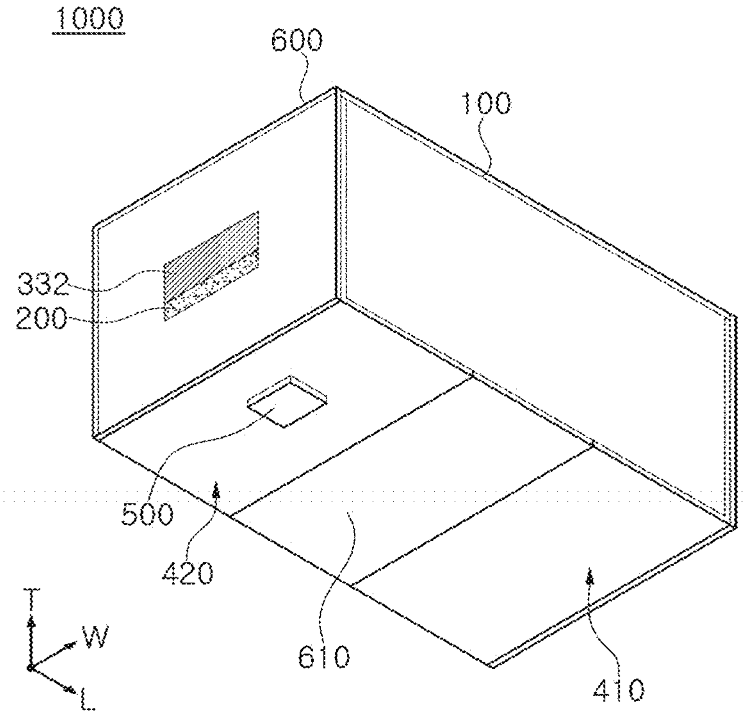
FIG. 2 is a diagram illustrating the coil component of FIG. 1 as viewed from a lower side.
Figure 4:
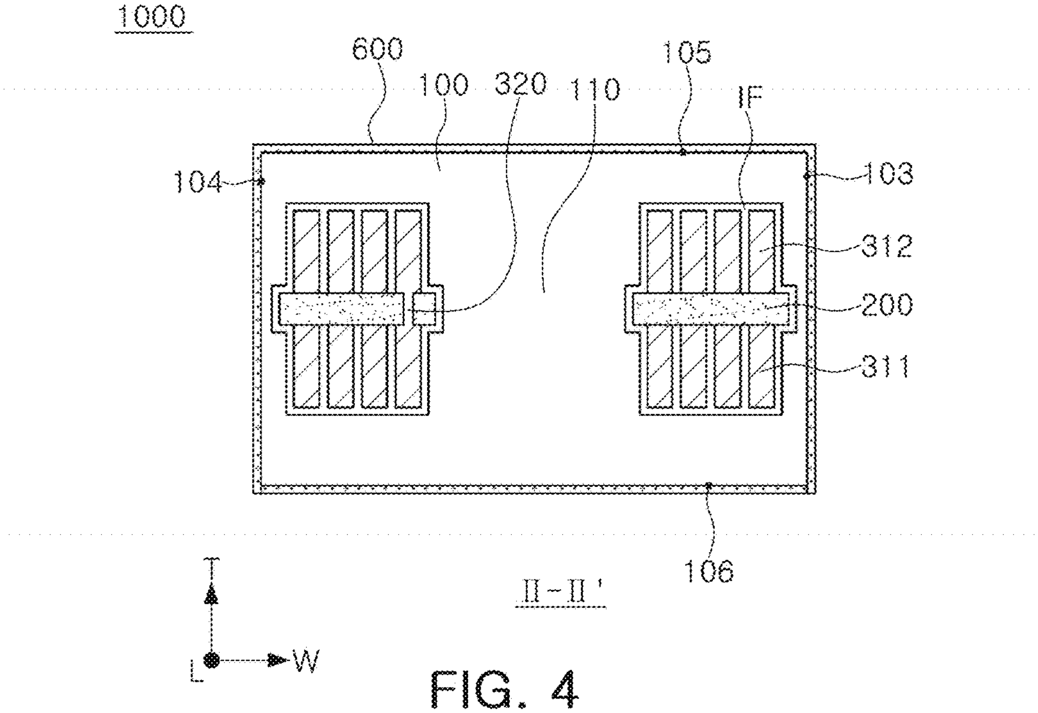
FIG. 4 is a cross-sectional view taken along line II-II' of FIG. 1.
Figure 5:
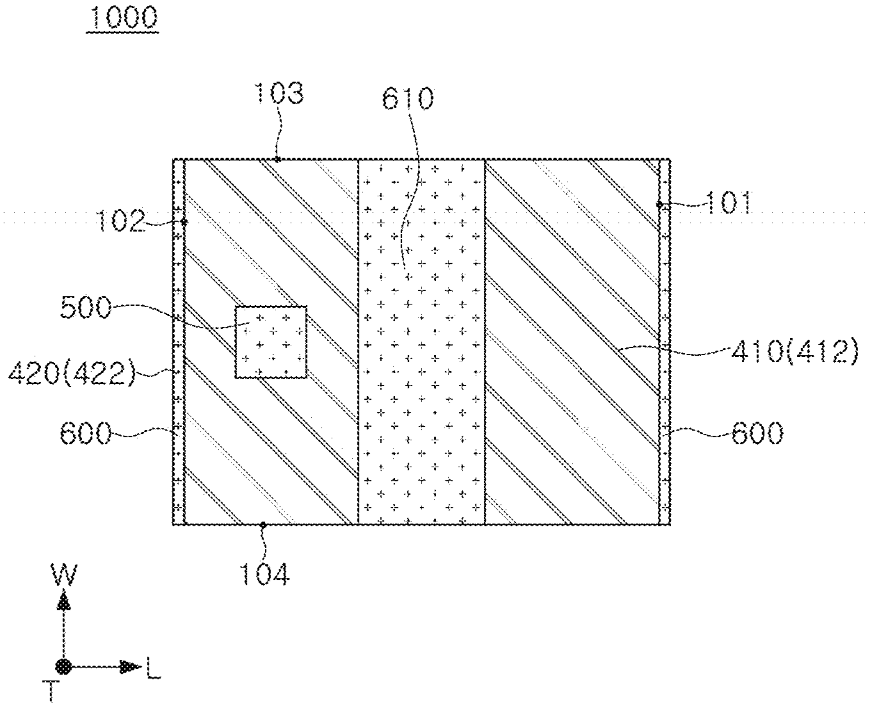
FIG. 5 is a bottom view of the coil component of FIG. 1.
Figure 6:
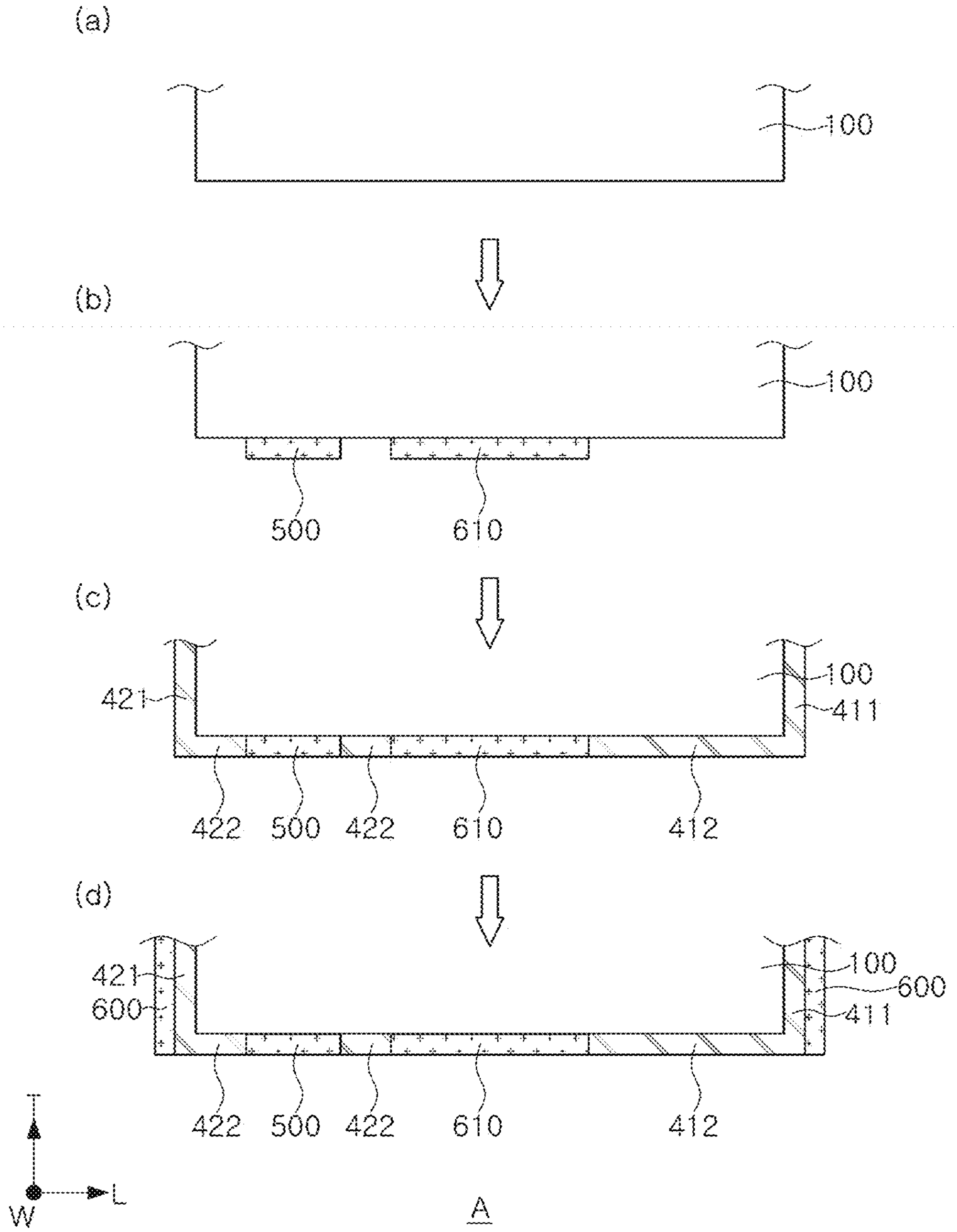
FIG. 6 is a diagram illustrating a process of forming a marking portion of the coil component of FIG. 1.

FIG. 1 is a perspective view schematically illustrating a coil component 1000 according to an exemplary embodiment in the present disclosure. FIG. 2 is a diagram illustrating the coil component 1000 of FIG. 1 as viewed from the lower side. FIG. 3 is a cross-sectional view taken along line I-I' of FIG. 1. FIG. 4 is a cross-sectional view taken along line II-II' of FIG. 1. FIG. 5 is a bottom view of the coil component 1000 of FIG. 1. FIG. 6 is a diagram illustrating a process of forming a marking portion 500 of the coil component 1000 of FIG. 1.

Referring to FIGS. 1 to 6D, the coil component 1000 according to an exemplary embodiment in the present disclosure may include a body 100, a substrate 200, a coil portion 300, external electrodes 410 and 420, a marking portion 500, a surface insulating layer 600, and a lower insulating layer 610 and may further include an insulating film IF.

The body 100 may form an exterior of the coil component 1000 according to the present exemplary embodiment, and may have the coil portion 300 and the substrate 200 disposed therein.

The body 100 may generally have a hexahedral shape.

The body 100 may have a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, based on a direction of FIGS. 1, 2, 3, 4, and 5. The first to fourth surfaces 101, 102, 103, and 104 of the body 100 may correspond to walls of the body 100 that connect the fifth surface 105 and the sixth surface 106 of the body 100 to each other. Hereinafter, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and both side surfaces (one side surface and the other side surface) of the body 100 may refer to the fifth surface 105 and the sixth surface 106 of the body 100, respectively.

The body 100 may be formed so that the coil component 1000 according to the present exemplary embodiment in which external electrodes 410 and 420 and a surface insulating layer 600 to be described later are formed may have a length of 2.0 mm, a width of 1.2 mm, and a thickness of 0.65 mm by way of example, but the present disclosure is not limited thereto. Meanwhile, the dimensions described above are merely design values that do not reflect process errors and the like, and it is thus to be considered that dimensions within ranges admitted as the processor errors fall within the scope of the present disclosure.

The length of the coil component 1000 described above may refer to a maximum length of lengths of a plurality of segments that connect between the outermost boundary lines of the coil component 1000 illustrated in an image of a cross-section of the coil component 1000 in the length direction L-thickness direction T at a central portion of the coil component 1000 in the width direction W, captured by an optical microscope or a scanning electron microscope (SEM), and are parallel to the length direction L. Alternatively, the length of the coil component 1000 described above may refer to an arithmetic mean value of lengths of three or more of a plurality of segments that connect between the outermost boundary lines of the coil component 1000 illustrated in the image of the cross-section and are parallel to the length direction L. Other measurement methods and/or tools appreciated by one of ordinary skill in the art, even if not described in the present disclosure, may also be used.

The thickness of the coil component 1000 described above may refer to a maximum length of lengths of a plurality of segments that connect between the outermost boundary lines of the coil component 1000 illustrated in an image of a cross section of the coil component 1000 in the length direction L-thickness direction T at a central portion of the coil component 1000 in the width direction W, captured by an optical microscope or an SEM, and are parallel to the thickness direction T. Alternatively, the thickness of the coil component 1000 described above may refer to an arithmetic mean value of lengths of three or more of a plurality of segments that connect between the outermost boundary lines of the coil component 1000 illustrated in the image of the cross section and are parallel to the thickness direction T. Other measurement methods and/or tools appreciated by one of ordinary skill in the art, even if not described in the present disclosure, may also be used.

The width of the coil component 1000 described above may refer to a maximum length of lengths of a plurality of segments that connect between the outermost boundary lines of the coil component 1000 illustrated in an image of a cross section of the coil component 1000 in the length direction L-width direction W at a central portion of the coil component 1000 in the thickness direction T, captured by an optical microscope or an SEM, and are parallel to the width direction W. Alternatively, the width of the coil component 1000 described above may refer to an arithmetic mean value of lengths of three or more of a plurality of segments that connect between the outermost boundary lines of the coil component 1000 illustrated in the image of the cross section and are parallel to the width direction W. Other measurement methods and/or tools appreciated by one of ordinary skill in the art, even if not described in the present disclosure, may also be used.

Alternatively, each of the length, the width, and the thickness of the coil component 1000 may be measured by a micrometer measurement method. In the micrometer measurement method, each of the length, the width, and the thickness of the coil component 1000 may be measured by setting a zero point with a gage repeatability and reproducibility (R&R) micrometer, inserting the coil component 1000 according to the present example exemplary embodiment between tips of a micrometer, and turning a measuring lever of a micrometer. Meanwhile, in measuring the length of the coil component 1000 by the micrometer measurement method, the length of the coil component 1000 may refer to a value measured once or refer to an arithmetic mean of values measured plural times. This may also be similarly applied to the width and the thickness of the coil component 1000.

The body 100 may include an insulating resin and a magnetic material. Specifically, the body 100 may be formed by stacking one or more magnetic composite sheets in which the magnetic materials are dispersed in the insulating resin. The magnetic material may be ferrite or metal magnetic powders.

The ferrite may be, for example, one or more of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, Li-based ferrite.

The metal magnetic powders may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powders may include at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based powder, and Fe—Cr—Al-based alloy powder.

The metal magnetic powders may be amorphous or crystalline. For example, the metal magnetic powders may be a Fe—Si—B—Cr based amorphous metal powder, but is not necessarily limited thereto.

The ferrite and the metal magnetic powders may have average diameters of about 0.1 μm to 30 μm, respectively, but are not limited thereto.

The body 100 may include two kinds or more of magnetic materials dispersed in the resin. Here, different kinds of magnetic materials mean that the magnetic materials dispersed in the resin are distinguished from each other by any one of an average diameter, a composition, crystallinity, and a shape.

Meanwhile, a description will hereinafter be provided on the assumption that the magnetic material is the magnetic metal powder, but the scope of the present disclosure is not limited to the body 100 having a structure in which the magnetic metal powders are dispersed in the insulating resin.

The insulating resin may include epoxy, polyimide, liquid crystal polymer (LCP), or the like, or mixtures thereof, but the present disclosure is not limited thereto.

The body 100 may include a core 110 penetrating through the substrate 200 and the coil portion 300 to be described later. The core 110 may be formed by filling a through-hole penetrating through central portions of each of the coil portion 300 and the substrate 200 with the magnetic composite sheets, but the present disclosure is not limited thereto.

The substrate 200 may be disposed in the body 100. The substrate 200 may be configured to support the coil portion 300 to be described later.

The substrate 200 may have an insulating material including a thermosetting resin such as an epoxy resin, a thermoplastic resin such as a polyimide resin, or a photosensitive insulating resin or include an insulating material having a reinforcement material such as a glass fiber or an inorganic filler impregnated in such an insulating resin. As an example, the substrate 200 may include an insulating material such as prepreg, an Ajinomoto Build-up Film (ABF), FR-4, a Bismaleimide Triazine (BT) resin, or a photoimagable dielectric (PID), but the present disclosure is not limited thereto.

As the inorganic filler, one or more materials selected from the group consisting of silica (silicon dioxide, $SiO_2$), alumina (aluminum oxide, $Al_2O_3$), silicon carbide (SiC), barium sulfate ($BaSO_4$), talc, clay, mica powders, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the substrate 200 is formed of the insulating material including the reinforcing material, the substrate 200 may provide more excellent rigidity. When the substrate 200 is formed of an insulating material that does not include the glass fiber, it may be advantageous in decreasing a thickness of the coil component 1000 according to the present exemplary embodiment. In addition, a volume occupied by the coil portion 300 and/or the magnetic metal powders may be increased on the basis of the body 100 having the same size, such that component characteristics may be improved. When the substrate 200 is formed of an insulating material including the photosensitive insulating resin, the number of processes for forming the coil portions 300 and 400 may be decreased, which may be advantageous in reducing a production cost and may be advantageous informing fine vias.

The thickness of the substrate 200 may be, for example, 10 μm or more and 50 μm or less, but the present disclosure is not limited thereto.

The coil portion 300 may be disposed in the body 100, and may implement characteristics of the coil component 1000. For example, when the coil component 1000 according to the present exemplary embodiment is used as a power inductor, the coil portion 300 may serve to store an electric field as a magnetic field to maintain an output voltage, resulting in stabilization of power of an electronic device.

The coil portion 300 includes coil patterns 311 and 312, a via 320, and lead-out parts 331 and 332. Specifically, based on the direction of FIGS. 1, 2, 3 and 4, the first coil pattern 311 and the first lead-out part 331 may be disposed on a lower surface of the substrate 200 opposing the sixth surface 106 of the body 100, and the second coil pattern 312 and the second lead-out part 332 may be disposed on an upper surface of the substrate 200 opposing the fifth surface 105 of the body 100.

The via 320 may penetrate through the substrate 200 and be in contact with and connected to inner end portions of each of the first coil pattern 311 and the second coil pattern 312. The first and second lead-out parts 331 and 332 may be connected to the first and second coil patterns 311 and 312, be exposed to the first and second surfaces 101 and 102 of the body 100, respectively, and be connected to external electrodes 410 and 420 to be described later, respectively. By doing so, the coil portion 300 may function as a single coil as a whole between the first and second external electrodes 410 and 420.

Each of the first coil pattern 311 and the second coil pattern 312 may have a planar spiral shape in which at least one turn is formed around the core 110. As an example, the first coil pattern 311 may have at least one turn formed around the core 110 on the lower surface of the substrate 200.

The lead-out parts 331 and 332 may be exposed to the first and second surfaces 101 and 102 of the body 100, respectively. Specifically, the first lead-out part 331 may be exposed to the first surface 101 of the body 100, and the second lead-out part 332 may be exposed to the second surface 102 of the body 100.

At least one of the coil patterns 311 and 312, the via 320, and the lead-out parts 331 and 332 may include at least one conductive layer.

As an example, when the second coil pattern 312, the via 320, and the second lead-out part 332 are formed by plating on the upper surface of the substrate 200, each of the second coil pattern 312, the via 320, and the second lead-out part 332, may include a seed layer and an electroplating layer. Here, the electroplating layer may have a single-layer structure or have a multilayer structure. The electroplating layer having the multilayer structure may be formed in a conformal film structure in which another electroplating layer is formed along a surface of any one electroplating layer or be formed in a shape in which another electroplating layer is stacked on only one surface of any one electroplating layer. The seed layer may be formed by a vapor deposition method or the like such as an electroless plating method or a sputtering method. The seed layers of each of the second coil pattern 312, the via 320, the second lead-out part 332 may be formed integrally with each other, and thus, boundaries therebetween may not be formed, but are not limited thereto. The electroplating layers of each of the second coil pattern 312, the via 320, the second lead-out part 332 may be formed integrally with each other, and thus, boundaries therebetween may not be formed, but are not limited thereto.

As another example, when the first coil pattern 311 and the first lead-out part 331 disposed on the lower surface of the substrate 200 and the second coil pattern 312 and the second lead-out part 332 disposed on the upper surface of the substrate 200 are formed separately from each other and are then collectively stacked beneath and on the substrate 200, respectively, to form the coil portion 300, the via 320 may include a high melting point metal layer and a low melting point metal layer having a melting point lower than that of the high melting point metal layer. Here, the low melting point metal layer may include a solder including lead (Pb) and/or tin (Sn). At least a portion of the low melting point metal layer may be melted due to a pressure and a temperature at the time of the collective stacking, such that, for example, an inter-metallic compound (IMC) layer may be formed at a boundary between the low melting point metal layer and the second coil pattern 312.

For example, as illustrated in FIGS. 3 and 4, the coil patterns 311 and 312 and the lead-out parts 331 and 332 may protrude from the lower surface and upper surface of the substrate 200, respectively. As another example, the first coil pattern 311 and the first lead-out part 331 may protrude from the lower surface of the substrate 200, and the second coil pattern 312 and the second lead-out part 332 may be embedded in the upper surface of the substrate 200 to be exposed to the upper surface of the substrate 200. In this case, a recess portion may be formed in at least one of the upper surface of the second coil pattern 312 and/or the second lead-out part 332, so the upper surface of the substrate 200 and the upper surface of the second coil pattern 312 and/or the upper surface of the lead-out part 332 may not be located on the same plane.

Each of the coil patterns 311 and 312, the via 320, and the lead-out parts 331 and 332 may include a conductive material such as copper (Cu), aluminum (Al), silver (Ag), tin (Sn), gold (Au), nickel (Ni), lead (Pb), titanium (Ti), chromium (Cr) or alloys thereof, but the present disclosure is not limited thereto.

The insulating film IF may be disposed between the coil portion 300 and the body 100 and between the substrate 200 and the body 100. The insulating film IF may be formed along the surface of the substrate 200 on which the coil patterns 311 and 312 and the lead-out parts 331 and 332 are formed, but the present disclosure is not limited thereto. The insulating film IF may be provided in order to insulate the coil portion 300 and the body 100 from each other, and may include a known insulating material such as parylene, but the present disclosure is not limited thereto. As another example, the insulating film IF may include an insulating material such as an epoxy resin rather than parylene. The insulating film IF may be formed by a vapor deposition method, but the present disclosure is not limited thereto. As another example, the insulating film IF may be formed by stacking and then hardening an insulation film for forming the insulating film IF on both surfaces of the substrate 200 on which the coil portion 300 is formed or may be formed by applying and then hardening an insulation paste for forming the insulating film IF onto both surfaces of the substrate 200 on which the coil portion 300 is formed. Meanwhile, for the reason described above, the insulating film IF may be omitted in the present exemplary embodiment. That is, when the body 100 has a sufficient electrical resistance at a designed operating current and voltage of the coil component 1000 according to the present exemplary embodiment, the insulating film IF may be omitted in the present exemplary embodiment.

The external electrodes 410 and 420 may be disposed on the body 100 so as to be spaced apart from each other, and may be connected to the coil portion 300. In the present exemplary embodiment, the external electrodes 410 and 420 may include, respectively, pad parts 412 and 422 disposed on the sixth surface 106 of the body 100 so as to be spaced apart from each other and connection parts 411 and 421 disposed, respectively, on the first and second surfaces 101 and 102 of the body 100.

Specifically, the first external electrode 410 may include a first connection part 411 disposed on the first surface 101 of the body 100 to be in contact with the first lead-out part 331 exposed to the first surface 101 of the body 100 and a first pad part 412 extending from the first connection part 411 to the sixth surface 106 of the body 100.

The second external electrode 420 may include a second connection part 421 disposed on the second surface 102 of the body 100 to be in contact with the second lead-out part 332 exposed to the second surface 102 of the body 100 and a second pad part 422 extending from the second connection part 421 to the sixth surface 106 of the body 100.

The first and second pad parts 412 and 422 may be disposed on the sixth surface 106 of the body 100 so as to be spaced apart from each other. Referring to FIGS. 1, 2, 3 and 5, the marking portion 500 to be described later may penetrate through any one of the first and second pad parts 412 and 422. In the present exemplary embodiment, the marking portion 500 may penetrate through the second pad part 412 included in the second external electrode 420.

The connection parts 411 and 412 and the pad parts 412 and 422 may be formed together and integrally with each other in the same process, such that boundaries therebetween are not formed, but are not limited thereto.

The external electrodes 410 and 420 may be formed by a vapor deposition method such as sputtering and/or a plating method, but the present disclosure is not limited thereto.

The external electrodes 410 and 420 may include a conductive material such as copper (Cu), aluminum (Al), silver (Ag), tin (Sn), gold (Au), nickel (Ni), lead (Pb), chromium (Cr), titanium (Ti), or alloys thereof, but are not limited thereto.

The external electrodes 410 and 420 may be formed in a single layer structure or a multilayer structure. As an example, the first external electrode 410 may include a first conductive layer including copper (Cu), a second conductive layer disposed on the first conductive layer and including nickel (Ni), and a third conductive layer disposed on the second conductive layer and including tin (Sn. At least one of the second conductive layer and the third conductive layer may cover the first conductive layer, but the present disclosure is not limited thereto. At least one of the second conductive layer and the third conductive layer may be disposed only on the sixth surface 106 of the body 100, but the present disclosure is not limited thereto. The first conductive layer may be a plating layer or be a conductive resin layer formed by applying and then hardening a conductive resin including conductive powders including at least one copper (Cu) and silver (Ag) and a resin. The second and third conductive layers may be plating layers, but are not limited thereto.

The marking portion 500 may be formed to identify a mounting direction when the coil component 1000 according to the present exemplary embodiment is mounted on a printed circuit board or the like. Since the winding direction of the coil portion 300 may be known through the marking portion 500, when the coil component 1000 is mounted, the influence of mutual inductance or the like may be predicted. As the electronic device becomes smaller, the coil component 1000 also becomes smaller, and since the adjacent distance between the coil components 1000 becomes closer when mounted on the printed circuit board, the configuration of the marking portion 500 for predicting mutual inductance may be more important.

The marking portion 500 may be disposed on the sixth surface 106 of the body 100 on which the pad parts 412 and 422 of the external electrodes 410 and 420 are disposed, and may penetrate through any one of the first and second external electrodes 410 and 420. In addition, since the marking portion 500 penetrates through any one of the first and second external electrodes 410 and 420, the side surface of the marking portion 500 may be surrounded by any one of the first and second external electrodes 410 and 420.

Referring to FIGS. 1, 2, 3 and 5, in the case of the coil component 1000 according to the present exemplary embodiment, the marking portion 500 may be disposed on the sixth surface 106 to pass through the second external electrode 420. The marking portion 500 may be formed together in the process of printing the lower insulating layer 610 which will be described later, and may be formed in various shapes such as a polygon, a circle, an oval, and a straight line according to a shape of a discharge part for printing the marking portion 500.

The marking portion 500 may have one surface in contact with the sixth surface 106 of the body 100 and the other surface opposing the one surface of the marking portion 500, and the other surface of the marking portion 500 may be located at the same level as the second external electrode (the enlarged view B in FIG. 3) or formed to protrude from the second external electrode 420 (the enlarged view B' in FIG. 3). When the thickness of the marking portion 500 is formed to be greater than the thickness of the second pad part 422 of the second external electrode 420, the marking portion 500 may protrude from the second external electrode 420. In this case, the thickness of the marking portion 500 may be about 20 μm and the thickness of the second pad part 422 may be about 15 μm, but the present disclosure is not limited thereto.

The marking portion 500 may be formed through the process of processing the marking portion 500 along with the printing of the lower insulating layer 610 to be described later on the area corresponding to the sixth surface 106 of the plurality of bodies 100, at a coil bar level where the plurality of bodies 100 are continuously formed with each other, but the scope of the present disclosure is not limited thereto.

Since the marking portion 500 does not include a magnetic material, as the volume of the marking portion 500 increases, the effective volume of the magnetic material of the body 100 may decrease, so component characteristics may deteriorate. Accordingly, in the present exemplary embodiment, unlike the existing method of forming the marking portion 500 on the fifth surface 105 of the body 100 by a separate screen printing process, the process of printing the marking portion 500 may be performed together while performing the process of printing the lower insulating layer 610 on the sixth surface 106 of the body 100 to implement the marking portion 500 and the lower insulating layer 610 at once, thereby solving the above-described problems.

More specifically, when the marking portion 500 is formed on the fifth surface 105 of the body 100 by a separate printing process, since the thickness of the marking portion 500 is added to the thickness of the surface insulating layer 600 to be described later, the effective volume of the magnetic material contributing to the characteristics of components is reduced. However, in the present exemplary embodiment, the marking portion 500 is directly disposed on the sixth surface 106 of the body 100, and as a result, the thickness of the entire coil component 1000 may be formed as thin as the thickness of the marking portion 500 compared to the existing method. In addition, since the process of printing the separate marking portion 500 may be omitted, the effect of increasing productivity may be expected.

Here, the thickness of the marking portion 500 may refer to a maximum length of lengths of a plurality of segments that connect between the outermost boundary line of the marking portion 500 and the sixth surface 106 of the body 100, illustrated in an image of a cross section of the coil component 1000 in the length direction L-thickness direction T at a central portion of the coil component 1000 in the width direction W, captured by an optical microscope or an SEM, and are parallel to the thickness direction T. Alternatively, the thickness of the marking portion 500 described above may refer to an arithmetic mean value of lengths of three or more of a plurality of segments that connect between the outermost boundary lines of the marking portion 500 and the sixth surface 106 of the body 100, illustrated in the image of the cross section and are parallel to the thickness direction T. Other measurement methods and/or tools appreciated by one of ordinary skill in the art, even if not described in the present disclosure, may also be used.

A detailed process sequence of forming the marking portion 500 will be described with reference to FIG. 6.

FIG. 6 is a diagram illustrating a process of forming a marking portion 500 of the coil component 1000 of FIG. 1.

Referring to FIG. 6, the body 100 including a magnetic material may be formed in FIG. 6(*a*), and the lower insulating layer 610 and the marking portion 500 to be described later in FIG. 6(*b*) may be formed together by an insulating printing process. A plating process may be performed to form the external electrodes 410 and 420 described above in FIG. 6(*c*). In this case, the previously formed lower insulating layer 610 and the marking portion 500 may function as a kind of plating resist on the sixth surface of the body 100. As a result, the external electrodes 410 and 420 including a conductive material may be formed in the remaining area of the sixth surface 106 of the body 100 excluding the lower insulating layer 610 and the marking portion 500. The surface insulating layer 600 to be described later with reference to FIG. 6(*d*) may be formed on the fifth surface 105 of the body 100 and the first to fourth surfaces 101, 102, 103, and 104 forming the side surface of the body 100 to cover the connection parts 411 and 421 of the external electrodes 410 and 420 on the first surface 101 and the second surface 102.

Since the marking portion 500 is formed in the same process as the lower insulating layer 610 to be described later, the marking portion 500 may include the same material as the lower insulating layer 610. Specifically, the marking portion 500 may include a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$. In addition, the marking portion 500 may include an insulating filler such as an inorganic filler, but the present disclosure is not limited thereto.

Referring to FIGS. 1, 2, 3 and 5, the coil component 1000 according to the present exemplary embodiment may further include a lower insulating layer 610 that is disposed in an area between the first and second pad parts of the external electrodes 410 and 420 on the sixth surface 106 of the body 100.

The lower insulating layer 610 may have an average thickness of about 15 μm. Here, the average thickness of the lower insulating layer 610 may refer to an arithmetic mean value of lengths of at least three or more equally spaced line segments among a plurality of line segments that connect an inner boundary line corresponding to an inner surface of the lower insulating layer 610 in contact with the sixth surface 106 of the body 100 and an outer boundary line corresponding to an outer surface of the lower insulating layer 610, illustrated in an image of a cross-section of the coil component 1000 in the length direction L-thickness direction T at a central portion of the coil component 1000 in the width direction W, captured by an optical microscope or a scanning electron microscope (SEM), and are parallel to the thickness direction T. Other measurement methods and/or tools appreciated by one of ordinary skill in the art, even if not described in the present disclosure, may also be used.

The lower insulating layer 610 may be a plating resist used to form the external electrodes 410 and 420 by plating. The lower insulating layer 610 may be formed by forming an insulating material for forming a lower insulating layer on the entire sixth surface 106 of the body 100 and then partially removing a portion corresponding to an area where the pad parts 412 and 422 of the external electrodes 410 and 420 are disposed and an area where the marking portion 500 is disposed. Alternatively, the lower insulating layer 610 may be formed by selectively forming the insulating material for forming the lower insulating layer in the area of the sixth surface 106 of the body 100 excluding the area where the pad parts 412 and 422 and the marking portion 500 are disposed.

As described above, the lower insulating layer 610 may be formed in the same manufacturing process as the marking portion 500. Accordingly, the lower insulating layer 610 and the marking portion 500 may include the same material as each other and have the same thickness with respect to the sixth surface 106 of the body 100.

The lower insulating layer 610 may be formed by forming the insulating material for forming the lower insulating layer 610 by a method such as a printing method, vapor deposition, spray application method, or film lamination method, but the present disclosure is not limited thereto.

The lower insulating layer 610 may include a thermoplastic resin such as polystyrenes, vinyl acetates, polyesters, polyethylenes, polypropylenes, polyamides, rubbers, or acryls, a thermosetting resins such as phenols, epoxies, urethanes, melamines, or alkyds, a photosensitive resin, parylene, $SiO_x$, or $SiN_x$. The lower insulating layer 610 may include an insulating filler such as an inorganic filler, but the present disclosure is not limited thereto.

The coil component 1000 according to the present exemplary embodiment may further include the surface insulating layer 600 disposed on the first through fifth surfaces 101, 102, 103, 104, and 105 of the body 100.

The surface insulating layer 600 may extend from the fifth surface 105 of the body 100 to at least portions of the first through fourth surfaces 101, 102, 103, and 104. In the case of the present exemplary embodiment, the surface insulating layer 600 may be disposed on each of the first to fifth surfaces 101, 102, 103, 104, and 105 of the body 100, and the surface insulating layer 600 disposed on the 101 and 102 of the body 100 may cover the connection parts 411 and 422 of the external electrodes 410 and 420.

At least portions of the surface insulating layer 600 disposed on each of the first to fifth surfaces 101, 102, 103, 104, 105, and 106 of the body 100 may be formed integrally with each other in the same process, such that boundaries therebetween are not formed, but are not limited thereto.

The surface insulating layer 600 may be formed by forming the insulating material for forming the surface insulating layer 600 by a method such as a printing method, vapor deposition, spray application method, or film lamination method, but the present disclosure is not limited thereto.

The surface insulating layer 600 may include a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$. The surface insulating layer 600 may include an insulating filler such as an inorganic filler, but the present disclosure is not limited thereto.

Second Exemplary Embodiment

Figure 7:
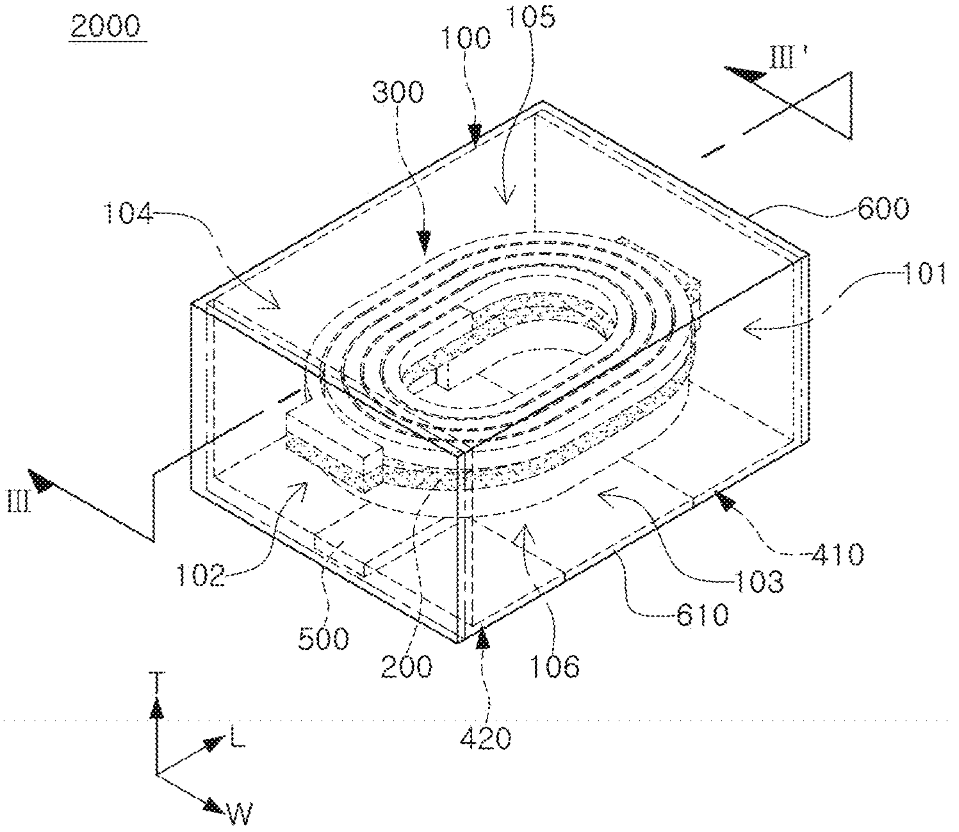
FIG. 7 is a perspective view schematically illustrating a coil component according to another exemplary embodiment in the present disclosure.
Figure 8:
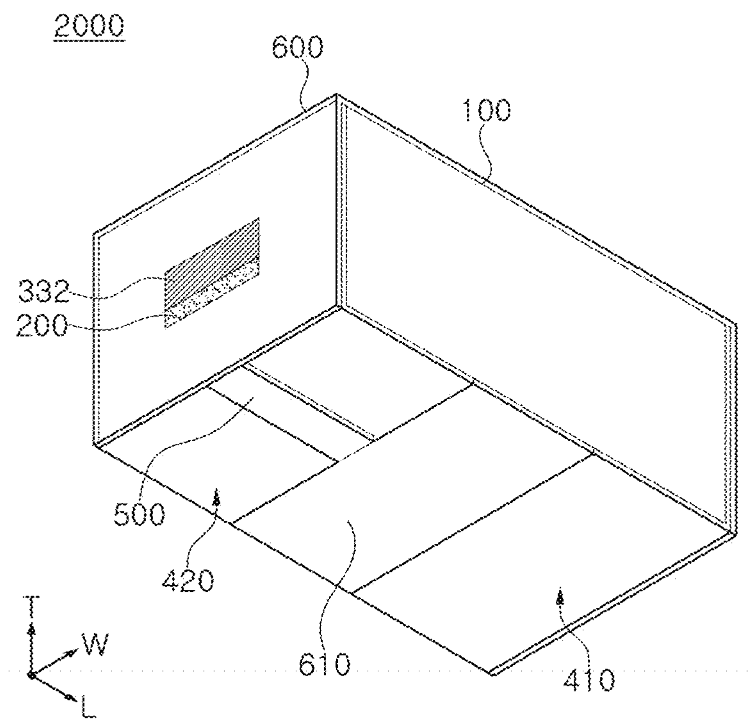
FIG. 8 is a diagram illustrating the coil component of FIG. 7 as viewed from a lower side.
Figure 9:
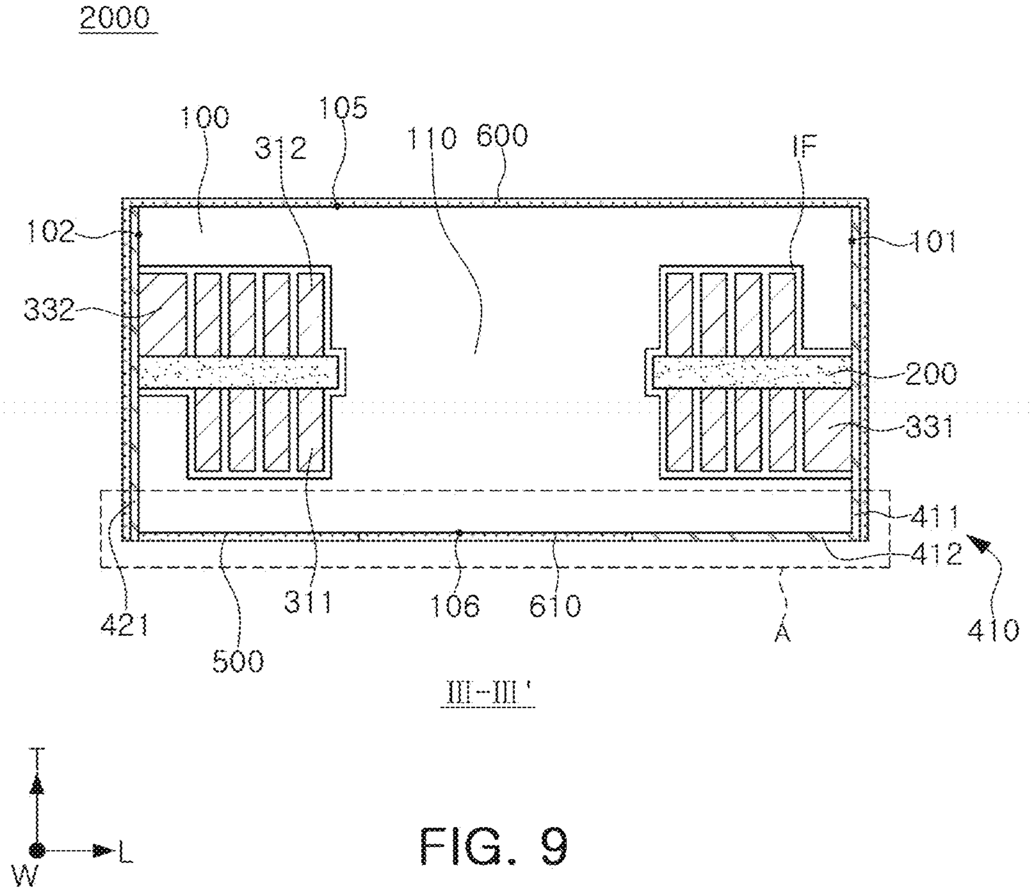
FIG. 9 is a cross-sectional view taken along line III-III' of FIG. 7.
Figure 10:
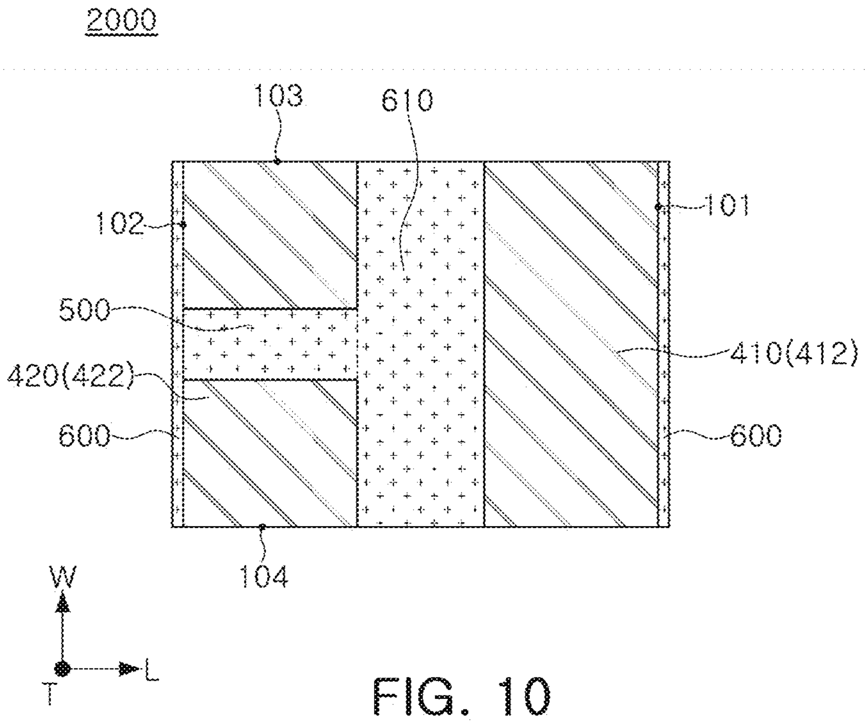
FIG. 10 is a bottom view of the coil component of FIG. 7.

FIG. 7 is a perspective view schematically illustrating a coil component 2000 according to another exemplary embodiment in the present disclosure. FIG. 8 is a diagram illustrating the coil component 2000 of FIG. 7 as viewed from the lower side. FIG. 9 is a cross-sectional view taken along line III-III' of FIG. 7. FIG. 10 is a bottom view of the coil component 2000 of FIG. 7.

Referring to FIGS. 7, 8, 9 and 10, compared with the coil component 1000 according to the exemplary embodiment in the present disclosure, the coil component 2000 according to another exemplary embodiment in the present disclosure is different in terms of the disposition and shape of the marking portion 500. Therefore, in describing the present exemplary embodiment, only the marking portion 500 different from that of the first exemplary embodiment in the present disclosure will be described. The description in the first exemplary embodiment in the present disclosure may be applied to other components of the present exemplary embodiment as it is.

The marking portion 500 may be disposed on the sixth surface 106 of the body 100 on which the pad parts 412 and 422 of the external electrodes 410 and 420 are disposed, and may be located in any one of the first and second external electrodes 410 and 420. In the case of the coil component 2000 according to the present exemplary embodiment, the marking portion 500 may be disposed on the sixth surface 106 and disposed on the second pad part 422 of the second external electrode 420.

The marking portion 500 may be connected to the lower insulating layer 610 while being formed in the same insulating printing process step as the lower insulating layer 610. In addition, the marking portion 500 and the lower insulating layer 610 may be formed in an integrated form without forming a boundary therebetween, but the scope of the present disclosure is not limited thereto.

Referring to FIGS. 7, 8, 9 and 10, when the marking portion 500 has a straight long shape, one side surface of the marking portion 500 may extend to the second surface 102 of the body 100, and the other side surface of the marking portion 500 may be connected to the lower insulating layer 610 to each other. In addition, the second pad part 422 of the second external electrodes 420 disposed on the sixth surface 106 of the body 100 may be divided into a first area where a side surface thereof is in contact with a third surface of the body 100 by the marking portion 500 and a second area where the side surface thereof is in contact with a fourth surface 104 of the body 100, but the scope of the present disclosure is not limited thereto.

Third Exemplary Embodiment

Figure 11:
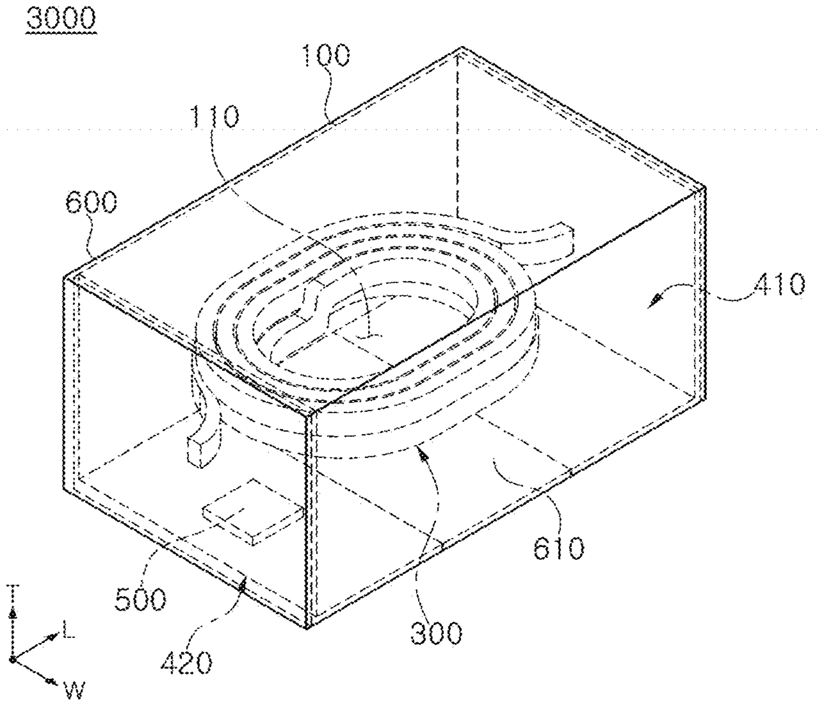
FIG. 11 is a perspective view schematically illustrating a coil component according to still another exemplary embodiment in the present disclosure.

FIG. 11 is a perspective view schematically illustrating a coil component 3000 according to still another exemplary embodiment in the present disclosure.

Referring to FIG. 11, compared with the coil component 1000 according to the exemplary embodiment in the present disclosure, the coil component 3000 according to another exemplary embodiment in the present disclosure is different in terms of the configuration of the coil portion 300 and the presence or absence of the substrate 200. Therefore, in describing the present exemplary embodiment, only the coil portion 300 different from that of the first exemplary embodiment in the present disclosure will be described. The description in the first exemplary embodiment in the present disclosure may be applied to other components of the present exemplary embodiment as it is.

The coil component 3000 according to the present exemplary embodiment may include the coil portion 300 of a winding type. In this case, the coil component 3000 according to the present exemplary embodiment does not include the substrate 200.

The coil portion 300 may be a winding coil formed by winding a metal wire such as a copper wire (Cu-wire) including a metal wire and a coating layer coating a surface of the metal wire. Accordingly, the entire surface of each of a plurality of turns of the coil portion 300 may be coated with the coating layer.

Meanwhile, the metal wire may be a flat wire, but the present disclosure is not limited thereto. When the coil portion 300 is formed of a flat line, a cross section of each turn of the coil portion 300 may have a rectangular shape.

The coating layer may include epoxy, polyimide, liquid crystal polymer (LCP), or the like, or mixtures thereof, but the present disclosure is not limited thereto.

As set forth above, according to an exemplary embodiment in the present disclosure, it is possible to omit a separate additional process step for printing a marking portion, and it is possible to provide a coil component having a thinner thickness compared to the existing method even after printing the marking portion.

Hereinabove, the exemplary embodiments of the present disclosure have been described, but those skilled in the art may variously modify and alter the present disclosure by adding, changing, or deleting components without departing from the spirit and scope of the present disclosure defined in the claims, and it is to be considered that these modifications and alterations fall in the scope of the present disclosure.

What is claimed is:

1. A coil component comprising:
a body;
a coil portion disposed in the body;
first and second external electrodes spaced apart from each other on a first surface of the body and respectively connected to the coil portion; and
a marking portion disposed on the first surface of the body and penetrating through the second external electrode,
wherein the body has a first end surface and a second end surface connected to the first surface of the body and opposing each other,
wherein one side of the marking portion extends to the second end surface of the body.

2. The coil component of claim 1, wherein
the first external electrode includes a first connection part disposed on the first end surface of the body to be connected to a first end portion of the coil portion extending to the first end surface of the body, and a first pad part extending from the first connection part onto the first surface of the body,
the second external electrode includes a second connection part disposed on the second end surface of the body to be connected to the second end portion of the coil portion extending to the second end surface of the body, and a second pad part extending from the second connection part onto the first surface of the body, and
the marking portion penetrates through the second pad part.

3. The coil component of claim 1, wherein the marking portion protrudes from the second external electrode.

4. The coil component of claim 1, further comprising:
a substrate disposed within the body,
wherein the coil portion includes first and second coil patterns each disposed on two surfaces of the substrate opposing each other, and a via penetrating through the substrate and connecting inner end portions of the first and second coil patterns to each other.

5. The coil component of claim 1, wherein the coil unit is a winding type coil.

6. The coil component of claim 1, further comprising:
a lower insulating layer disposed on the first surface of the body between the first and second external electrodes.

7. The coil component of claim 6, further comprising:
a surface insulating layer covering the remaining surfaces excluding the first surface of the body.

8. The coil component of claim 6, wherein the lower insulating layer and the marking portion are connected to each other.

9. The coil component of claim 8, wherein the lower insulating layer and the marking portion are integrated with each other.

10. The coil component of claim 8, wherein an area of the second external electrode disposed on the first surface of the body is divided into two areas by the marking portion.

11. The coil component of claim 6, wherein the marking portion and the lower insulating layer include the same material.

12. The coil component of claim 11, wherein the lower insulating layer and the marking portion are integrated with each other.

13. The coil component of claim 11, wherein the lower insulating layer and the marking portion are connected to each other.

14. The coil component of claim 13, further comprising:

a surface insulating layer covering the remaining surfaces excluding the first surface of the body.

15. A coil component comprising:

a body;

a coil portion disposed in the body; and first and second external electrodes spaced apart from each other on a first surface of the body and respectively connected to the coil portion, wherein the second external electrode includes a hole in which an insulating material is filled, wherein the body has a first end surface and a second end surface connected to the first surface of the body and opposing each other, wherein one side of the hole extends to the second end surface of the body.

16. The coil component of claim 15, further comprising:

a lower insulating layer disposed on the first surface of the body between the first and second external electrodes.

17. The coil component of claim 16, wherein, when the insulating material filling the hole is a marking portion, the marking portion and the lower insulating layer include the same material.

18. The coil component of claim 17, wherein the lower insulating layer and the marking portion are connected to each other.

19. The coil component of claim 16, wherein the first and second external electrodes further extend onto the first end surface and the second end surface of the body, respectively, that are connected to the first surface of the body and oppose each other, the lower insulating layer extends to two side surfaces opposing each other that is connected to the first surface of the body and connect the first and second end surfaces to each other.

20. A coil component comprising:

a body;

a coil portion disposed in the body;

first and second external electrodes spaced apart from each other on a first surface of the body and respectively connected to the coil portion; and an insulating layer including a first portion and a second portion disposed on the first surface, wherein the first portion is disposed between the first and second external electrodes, and the second portion is surrounded by a portion of the second external electrode, wherein the body has a first end surface and a second end surface connected to the first surface of the body and opposing each other, wherein one side of the second portion extends to the second end surface of the body.

21. The coil component of claim 20, wherein the first portion and the second portion of the insulating layer are connected to each other on the first surface of the body.

22. The coil component of claim 20, wherein the second portion of the insulating layer has a shape of one of a polygon, a circle, an oval, or a straight line.

23. The coil component of claim 20, wherein the first portion and the second portion of the insulating layer include the same material as each other and have the same average thickness.

24. The coil component of claim 20, wherein the first portion and the second portion of the insulating layer are spaced apart from each other on the first surface of the body.

25. The coil component of claim 24, wherein the first portion and the second portion of the insulating layer have the same material.

26. The coil component of claim 24, wherein one surface of the first portion and one surface of the second portion of the insulating layer, that are away from the first surface of the body, are at the same height level as each other or at different height levels from each other.

* * * * *